(No Model.)
S. J. STOFER.
FIRE ESCAPE.
No. 291,423. Patented Jan. 1, 1884.
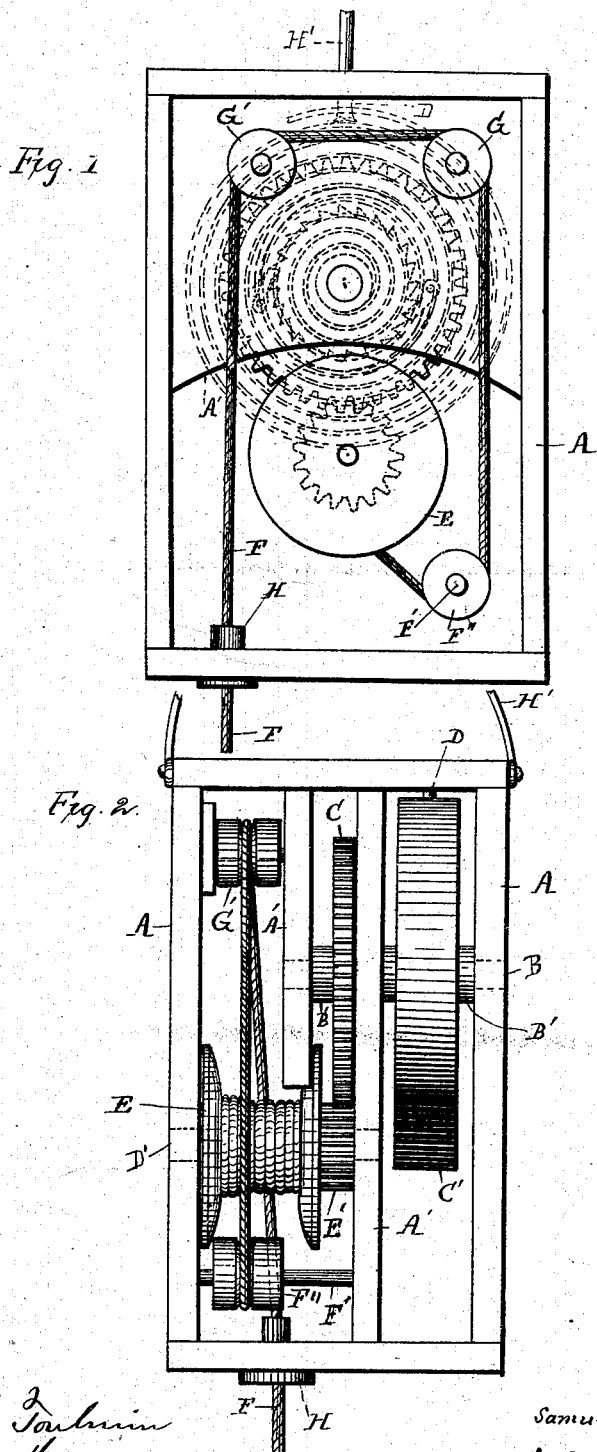

UNITED STATES PATENT OFFICE.

SAMUEL J. STOFER, OF NORTH LIBERTY, INDIANA.

FIRE-ESCAPE.

SPECIFICATION forming part of Letters Patent No. 291,423, dated January 1, 1884.

Application filed July 26, 1883. (No model.)

*To all whom it may concern:*

Be it known that I, SAMUEL J. STOFER, a citizen of the United States, residing at North Liberty, in the county of St. Joseph and State of Indiana, have invented certain new and useful Improvements in Fire-Escapes; and I do hereby declare the following to be a full, clear, and exact description of the invention, such as will enable others skilled in the art to which it appertains to make and use the same.

This invention relates to certain new and useful improvements in fire-escapes; and it has for its object to provide an apparatus which shall be portable and easily carried from place to place, which can be used or operated from different heights, and which shall be capable of lowering different numbers of persons, the peculiarities of which will hereinafter more fully appear.

In the accompanying drawings, forming a part of this specification, and on which like letters of reference indicate corresponding features—

Figure 1 represents a view of my improved apparatus in side elevation, with one side of the casing removed, the main cog-wheel and the actuating-spring being shown by the dotted lines, and Fig. 2 a view thereof, looking at the rear or back of the same, that portion of the casing being removed.

The letter A indicates a box or casing, constructed preferably of iron, and within which are located and journaled the several operative parts, as will presently appear. This casing is provided with vertical partitions or standards A', which form journal-bearings for the several shafts.

The letter B refers to a shaft having its bearings in the casing and in one of the said partitions, and it is provided with a drum, B', near one end, and with the main or larger cog-wheel C near the other. Secured to said drum B' is the inner end of the coil-spring C', the outer end of which is attached to the casing by a stud, D.

The letter D' indicates a second or auxiliary shaft, the same being journaled in the casing and one of the said partitions, and provided with a flanged drum, E, near one end, and with a pinion or smaller cog-wheel, E', at the other, the said pinion engaging or meshing with the main cog-wheel C.

A chain or rope, F, the function of which will presently appear, has its inner end firmly secured to the flanged drum E, upon which it is adapted to be wound and unwound. This rope passes over a pulley, F''', having a groove in its periphery, and loosely mounted upon a fixed shaft, F', having its bearings also in the casing and in one of the partitions A', the said pulley being adapted to travel from end to end of said shaft, and thereby guide the rope evenly around the flanged rope-drum E. This rope or chain then passes over two other similarly-mounted (save that they do not slide on their shafts) grooved pulleys, G and G', which serve to conduct the rope to the outer side of the casing, so as to clear the wall of the building as much as practicable. The rope then descends through an eye or thimble, H, secured to the lower end of the casing, and is provided at its free end with suitable means to receive or attach to the passengers. The upper portion of the casing has connected therewith a bail, H', which, when the apparatus is in use, is secured to the building near the window in any convenient manner.

It will be observed that when passengers are being lowered the rope unwinds from the flanged drum, and the pinion and main cog-wheel thereby being made to rotate, act to wind the coil-spring upon its drum; also, as the load nears the ground the increased tension of the spring exercises a greater resistance to the gravitation of the load, thereby gradually checking its momentum and causing it to strike gently and softly upon the ground. When the load is freed from the rope, the latter is elevated by the recoil of the spring.

In order that the spring may be equally wound by a greater or less distance of descent, the relative diameter of the cog-wheel and pinion should be changed, for greater distances the cog being increased and the pinion decreased in diameter, while for less distances the change made is just the reverse.

Having thus fully described my invention, what I claim as new, and desire to secure by Letters Patent, is—

In a fire-escape, the combination, with the metallic casing having partitions, and the shaft having the coil-spring secured thereto and to the casing, and the main cog-wheel, of the shaft having the meshing-pinions and the flanged rope-drum, the traveling rope-guiding pulley, the non-sliding rope-guiding pulley, the rope-thimble, and the rope or chain, the said shafts being journaled in the casing and its partitions, substantially as described.

In testimony whereof I affix my signature in presence of two witnesses.

SAMUEL J. STOFER.

Witnesses:
  WILL. E. MYLER,
  JOSEPH TURNOCK.